Sept. 9, 1969  J. W. WIMBERLEY  3,465,502
METHOD FOR SEPARATING PARAFFIN HYDROCARBONS FROM
HALOPARAFFIN HYDROCARBONS
Filed Sept. 25, 1967
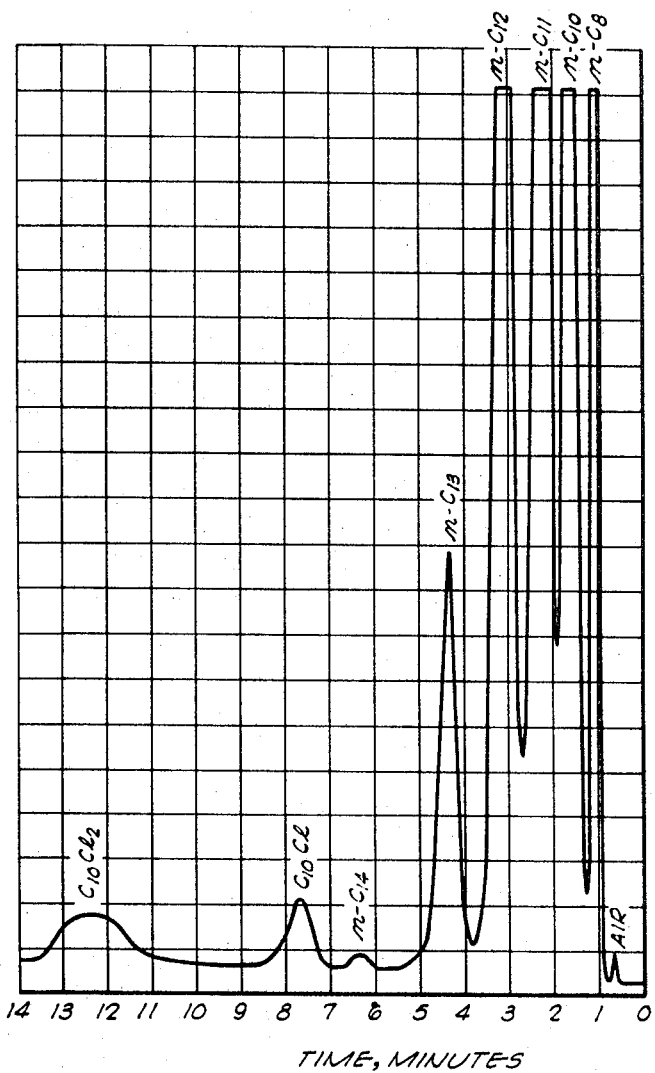
INVENTOR.
JERRY W. WIMBERLEY
BY
William A. Mikesell Jr.
ATTORNEY

United States Patent Office 3,465,502
Patented Sept. 9, 1969

3,465,502
METHOD FOR SEPARATING PARAFFIN HYDROCARBONS FROM HALOPARAFFIN HYDROCARBONS
Jerry W. Wimberley, Ponca City, Okla., assignor to Continental Oil Company, Ponca City, Okla., a corporation of Delaware
Filed Sept. 25, 1967, Ser. No. 670,244
Int. Cl. B01d *15/08;* G01n *31/08*
U.S. Cl. 55—67                                        14 Claims

ABSTRACT OF THE DISCLOSURE

A method for separating paraffin hydrocarbons from haloparaffin hydrocarbons, and also for separating monohaloparaffin compounds from polyhaloparaffins, which includes the steps of incorporating small amounts of orthophosphoric acid in a polar liquid substrate which exhibits a preferential chromatographic affinity for paraffin hydrocarbons relative to haloparaffin hydrocarbons, then packing a chromatographic column with the phosphoric acid-carrying polar liquid and a suitable particulate solid substrate, and finally, passing the mixture of hydrocarbons to be separated through the packed column.

BACKGROUND OF THE INVENTION

Field of the invention

This invention relates to chromatographic methods of separating hydrocarbon materials, and more particularly, to a gas-liquid chromatographic method of separating paraffin hydrocarbons from haloparaffins, and also for separating monohaloparaffin compounds from poly-haloparaffin compounds.

Brief description of the prior art

It has heretofore been proposed to pretreat certain solid inorganic substrates intended for use as inert supports in gas-liquid chromatography with orthophosphoric acid in order to inactivate such inorganic carrier materials, and thereby improve the efficiency of separation of certain materials on a chromatographic column in which such solid particulate packing is used. By one method of accomplishing such inactivation as disclosed is U.S. Patent 3,271,930, the orthophosphoric acid is placed on the inorganic solid carrier particles, and these particles are then heated over an extended period of time to drive off the phosphoric acid and leave the solid carrier particles desirably inactivated. Another method which is mentioned in the cited patent as having been used in the prior art is that of mixing orthophosphoric acid and stearic acid with certain specific substrate liquids which are then placed on the solid substrate and used in a packed column for the separation of certain materials by gas-liquid chromatography. The types of liquid substrates which are mentioned for use in such method of inactivation are silicone oil, a relatively nonpolar liquid substrate, and a liquid substrate of intermediate polarity, dioctyl sebacate. Using the latter liquid substrate, separations of various carboxylic acids, such as formic acid, acetic acid, propionic acid, and butyric acid from each other, as well as resolution of a mixture of methanol, ethanol, propanol and butanol, are accomplished.

BRIEF DESCRIPTION OF THE PRESENT INVENTION

The present invention provides a new method for more effectively separating paraffin hydrocarbons from haloparaffin hydrocarbons, and for more efficiently separating monosubstituted haloparaffin compounds from poly-substituted haloparaffin compounds. Broadly described, the method of the present invention comprises mixing from about 1 to about 5 parts by weight of orthophosporic acid ($H_3PO_4$) with from about 10 parts to about 30 parts by weight of a polar liquid substrate material having a differential affinity for paraffin hydrocarbons of differing degrees of halogen substitution. The mixture is then placed upon an inert, solid particulate substrate material with the liquid substrate, including the acid, being distributed upon the solid particulate material in a weight percent ratio of from about 11:89 to about 35:65, liquid substrate to solid substrate. The proportion of orthophosphoric acid, polar liquid substrate material and inert solid substrate which are utilized in the method can perhaps better be expressed as weight percents of each material. Thus, the weight percent of the orthophosphoric acid employed can range from about 1 weight percent to about 5 weight percent, the weight of polar liquid substrate can range from about 10 weight percent to about 30 weight percent and the amount of inert solid substrate material can range from about 65 weight percent to about 89 weight percent. A tubular chromatographic column is then packed with the substrate materials prepared as thus described, and a mixture of paraffin hydrocarbon compounds which differ in the extent to which they are substituted by halogen atoms is passed through the column under suitable chromatographic separation conditions, and the mixture is resolved into the several component compounds.

It has been observed in the past that when it is undertaken to resolve a mixture of paraffin hydrocarbons and haloparaffin hydrocarbons by gas-liquid partition chromatography, the haloparaffins tend to be decomposed in the column to hydrogen halides and olefin compounds, and thus cannot be recovered intact from the chromatographic column. I have found that the employment of small amounts of orthophosphoric acid in the polar liquid substrate prevents decomposition of the halogen substituted paraffin compounds, and permits them to pass through the column intact after they are resolved from the paraffin hydrocarbons by the palor liquid substrate. Moreover, whereas in prior attempts to chromatographically separate a mixture of mono- and poly-substituted haloparaffin hydrocarbons by the polar liquid substrate. Moreover, pounds to form hydrogen halides and olefins occurs to an extent such that they cannot be recovered in pure form in any significant quantities, the present invention is useful in preventing decomposition of the substituted paraffin compounds, and in permitting them to be resolved from each other on the basis of their degree of substitution and total number of carbon atoms in the molecule.

From the foregoing description of the invention, it will have become apparent that an important object of the present invention is to provide an improved method for resolving or separating mixtures of paraffin hydrocarbons with halogen substituted paraffin hydrocarbons.

Another object of the invention is to provide an effective method for chromatographically separating mixtures of haloparaffin compounds having different numbers of halogen atoms in such compounds into the several components of the mixture.

A more specific object of the present invention is to prevent the decomposition of haloparaffin compounds during the course of isolating these compounds from homologs by gas-liquid partition chromatography.

Additional objects and advantages will become apparent as the following detailed description of the invention is read in conjunction with the accompanying drawing which graphically illustrates results obtained in the practice of the invention.

BRIEF DESCRIPTION OF THE DRAWINGS

The sole figure of the drawing is a chromatogram depicting graphically the separation of a mixture of compounds using the method of the invention.

DETAILED DESCRIPTION OF PREFERRED EMBODIMENTS OF THE INVENTION

As has been hereinbefore indicated, the process of the invention broadly comprises mixing a relatively small amount of orthophosphoric acid with a polar substrate liquid and placing this mixture on the surfaces of inert, solid particles to prepare a packing for a chromatographic column, then, after packing the column, passing the mixture of paraffinic hydrocarbons to be separated through the packed column under conditions of temperature and pressure to effect separation of the mixture into its several components. The usefulness of the invention resides primarily in permitting chromatographic separations of substituted and unsubstituted paraffinic hydrocarbons of the general structural formula $C_nH_{2n+2-y}X_y$ where $n$ is the number of carbon atoms present, X is a halogen atom, and $y$ is an integer of from zero to $2_n+2$. It is contemplated that the mixture to be resolved will contain compounds differing from each other in the extent of halogen substitution. The greatest utility of the invention is realized in the separation of $C_8$–$C_{16}$ hydrocarbons having the described structure, and particularly, mixtures of such hydrocarbons in which the extent of halogen substitution is such that $y$ does not exceed 5 in any of the compounds.

The liquid substrate utilized in the practice of the invention is a polar material having a selective adsorptive affinity for unsubstituted paraffin hydrocarbons as compared to halogen substituted paraffin hydrocarbons. This property of selectivity can be empirically determined when the decomposition of the haloparaffins is prevented by using the technique of the present invention. A preferred polar liquid material for use in conjunction with the relatively small amount of orthophosphoric acid is diethylene glycol succinate, but others, such as butanediol adipate, butanediol succinate, castor wax, 1,2,3-tris (2 cyanoethoxy) propane, ethoxylated n-phenol, diethylene glycol glutarate, and diethylene glycol tetrachlorophthalate, can also be utilized. Polyphenyl ethers are useful, but are not as selective as the more preferred ethylene glycol polyesters.

The relative amounts of orthophosphoric acid and polar liquid used in preparing the liquid substrate mixture are from about 1 to about 5 parts by weight, and from about 10 to about 30 parts by weight, respectively. Preferably, about 2 parts by weight of the acid and 25 parts by weight of the polar liquid are utilized in formulating the mixture. This mixture is then positioned on the surface of an inert solid particulate column packing material to form a column packing which includes from about 1 weight percent to about 5 weight percent orthophosphoric acid, from about 10 weight percent to about 30 weight percent of the polar liquid, and from about 65 weight percent to about 89 weight percent of the inert solid particles. Preferably, from about 70 to 75 weight percent of the inert solid is utilized in the packing.

The type of solid particulate material used as a support for the substrate liquid in the column packing is not critical, provided only that the material is inert in the sense of exhibiting no selective affinity for the components of the mixture to be resolved, and in being non-reactive with the substrate liquid. Such well-known and conventional column packing materials as crushed, acid treated firebrick and kieselguhr-clay mixtures can be utilized. A 60–80 mesh white firebrick marketed under the trade name Chromosorb W has been found to be very suitable.

The column packing is preferably prepared by dissolving the required amount of orthophosphoric acid in acetone and slurrying this solution with the previously prepared polar liquid substrate-coated solid particles. The acetone is then slowly boiled off on a steam bath while stirring The packing may also be prepared in many cases by dissolving both the orthophosphoric acid and polar substrate in acetone, then depositing them simultaneously on the surface of the solid particles by vaporizing the acetone.

The size of the column utilized in the practice of the invention is subject to wide variation, and may range from small laboratory type columns for use in analytical procedures, to large industrial preparative columns for producing large quantities of relatively pure halogen substituted paraffin hydrocarbons. The process parameters employed are also subject to substantial variation, with the temperature and pressure utilized being dependent upon the average molecular weight of the mixture to be separated, the length of time which is available for passing the mixture through the column, the extent of resolution desired, the diameter and length of the column employed, and the packing density. In general, however, the temperature at which the column is maintained during the passage of the mixture therethrough may range from about 45° to about 210° C., with a temperature of from about 100° C. to about 190° C. being preferred. A pressure of from about 5 p.s.i.g. to about 100 p.s.i.g. may suitably be employed, though in tightly packed, large columns, even higher pressures may sometimes be desirable.

The following examples further illustrate the practice of the invention.

EXAMPLE 1

An aluminum tube, 3 feet in length and ¼ inch in diameter, was picked with a particulate packing consisting essentially of 75 weight percent crushed white firebrick, 79–80 mesh, of the type marketed under the trade name Chromosorb W, and 25 weight percent of the polar liquid, diethylene glycol succinate, distributed on the surface of the firebrick. A sample of pure 1,2-dichlorododecane was then injected into the column and displaced through the column with helium at a temperature of 160° C. and a pressure of 30 p.s.i.g., yielding a flow rate of about 65 ml./min.

The emergence of gases from the column was monitored with a strip chart recorder and the gases emerging from the column were qualitatively identified. The results obtained indicated that the dichlorododecane was decomposed to hydrogen chloride and $C_{12}$ olefin. The hydrogen chloride emerged from the column simultaneously with the air pulse resulting characteristically from sample injection, and the olefin compound emerged about three minutes later.

The same aluminum tube was then packed with 73 weight percent white firebrick carrying a liquid substrate consisting of 25 weight percent diethylene glycol succinate mixed with 2 weight percent $H_3PO_4$. This packing was prepared by dissolving about 2.4 weight percent (based on total packing composition) of 85 percent $H_3PO_4$ in acetone, and slurrying this solution with firebrick coated with the ethylene glycol ester, then boiling off the acetone on a steam bath.

The 1,2-dichlorododecane was then again passed through the column at 160° C. and 30 p.s.i.g. The 1,2-dichloride emerged from the column intact after about ten minutes. No discernible hydrogen chloride was formed. These results, of course, demonstrate the effectiveness of the small amount of $H_3PO_4$ in preventing decomposition of the halogen substituted paraffin compound.

EXAMPLE 2

An aluminum column, 3 feet in length and ¼ inch in diameter, was packed with a packing containing 73 weight percent crushed white firebrick supporting a mixture of 25 weight percent diethylene glycol succinate and 2 weight percent $H_3PO_4$.

A mixture containing about 14 weight percent n-octane, about 16 weight percent n-decane, about 30 weight percent n-undecane, about 25 weight percent n-dodecane, about 7 weight percent n-tridecane, about 0.5 weight percent n-tetradecane, about 2 weight percent 1-chlorodecane and about 2 weight percent 1,2-dichlorodecane was injected into the column and moved therethrough by inert carrier gas at a temperature of 160° C. and a pressure of 30 p.s.i.g. The emergence of the various resolved components was recorded on a strip chart recorder, and the resulting chromatogram is depicted in the accompanying drawing. It will be noted that the 1-chlorodecane emerged intact one minute after the n-tetradecane, and about five minutes after the n-decane. It will be further noted that the 1,2-dichlorodecane was effectively separated from the 1-chlorodecane.

EXAMPLE 3

A chromatographic column, 9 feet in length and ¼ inch in diameter, is packed with crushed firebrick coated with butanediol adipate containing 4 weight percent orthophosphoric acid. A gaseous mixture containing 1-chlorooctane, 1,2-chlorooctane, 1,1,2-trichlorooctane and 1-chlorononane is passed through the column at 140° C. and 20 p.s.i.g. The several individual compounds are well separated from each other by the column over a period of about twenty minutes.

EXAMPLE 4

A column, 20 feet in length and 6 inches in diameter, is packed with crushed firebrick coated with a liquid mixture containing 30 parts by weight castor wax and 5 parts by weight orthophosphoric acid. A mixture of n-pentadecane, 1-chloropentadecane, hexadecane and 1-chlorohexadecane is then vaporized and displaced through the column by helium gas at a flow rate of about 16 liters/min. and a temperature of 200° C. The resolved components of the vaporized mixture emerge from the column in the sequence n-pentadecane, n-hexadecane, 1-chloropentadecane and 1-chlorohexadecane.

EXAMPLE 5

A chromatographic column, 10 feet in length and 1 inch in diameter, containing a packing consisting of 12 weight percent 1,2,3-tris(2 cyanoethoxy) propane, 1 weight percent orthophosphoric acid, and 87 weight percent of kieselguhr-clay solid particulate material is heated to a constant temperature of 70° C. A mixture of n-pentane, n-hexane, n-heptane, 1-bromopentane, 1-bromohexane, 1-chloroheptane, and 1,2-dichlorohexane is then displaced through the column with nitrogen gas. Resolution of the mixture into its several components is effected by passage through the column.

What is claimed is:
1. A method for separating paraffin hydrocarbon compounds differing from each other in the extent to which they are substituted by halogen atoms comprising passing the compounds to be separated in a gaseous state through a chromatographic column containing as a packing material
   an inert solid particulate supporting material, and
   a mixture containing orthophosphoric acid and a polar liquid demonstrating selective affinity for paraffin hydrocarbon compounds differing in the extent to which they are substituted with halogen atoms, said mixture containing from about 1 to about 5 parts by weight of said acid and from about 10 to about 30 parts by weight of said polar liquid, and being distributed on the surfaces of said solid particulate material.

2. The method defined in claim 1 wherein the proportions of solid and liquid components of the packing material are from about 1 weight percent to about 5 weight percent orthophosphoric acid, from about 10 weight percent to about 30 weight percent of the polar liquid, and from about 65 weight percent to about 89 weight percent of the solid particulate material.

3. The method defined in claim 2 wherein said paraffin compounds contain from 8 to 16 carbon atoms.

4. The method defined in claim 2 wherein the halogen atom substituents in said compounds to be separated are chlorine atoms.

5. The method defined in claim 2 wherein said packing material contains about 2 weight percent orthophosphoric acid.

6. The method defined in claim 2 wherein said inert solid particulate material is crushed white firebrick.

7. The method defined in claim 2 wherein said packing material is prepared, in part, by depositing said acid on said solid particulate material by slurrying the solid particulate material in a solution of the acid in a volatile organic solvent, and then evaporating the solvent.

8. The method defined in claim 2 wherein said chromatographic column is maintained at a temperature of from about 45° C. to about 210° C. and a pressure of from about 5 p.s.i.g. to about 100 p.s.i.g. during the passage therethrough of the compounds to be separated.

9. The method defined in claim 8 wherein said polar liquid is an ethylene glycol polyester.

10. The method defined in claim 9 wherein the polar liquid is diethylene glycol succinate.

11. The method defined in claim 10 wherein said inert solid particulate material is crushed firebrick.

12. The method defined in claim 11 wherein said packing material contains about 2 weight percent orthophosphoric acid.

13. The method defined in claim 12 wherein said paraffin compounds contain from 8 to 16 carbon atoms.

14. The method defined in claim 13 wherein the halogen atom substituents in said compounds to be separated are chlorine atoms.

References Cited

UNITED STATES PATENTS

| | | | |
|---|---|---|---|
| 3,047,992 | 8/1962 | Jones | 55—67 |
| 3,074,881 | 1/1963 | Jones | 55—67 X |
| 3,116,161 | 12/1963 | Purnell | 55—67 X |
| 3,156,548 | 11/1964 | Perry | 55—197 |
| 3,271,930 | 9/1966 | Ewald et al. | 55—67 |

JAMES L. DE CESARE, Primary Examiner